United States Patent

Masuo et al.

[11] Patent Number: 6,034,961
[45] Date of Patent: Mar. 7, 2000

[54] ACTIVE/STANDBY ROUTING SYSTEM ON ATM NETWORK

[75] Inventors: Hitoshi Masuo; Atsushi Iwata, both of Tokyo, Japan

[73] Assignee: NEC Corporation, Tokyo, Japan

[21] Appl. No.: 08/998,666

[22] Filed: Dec. 29, 1997

[30] Foreign Application Priority Data

Dec. 27, 1996 [JP] Japan .................................. 8-351470

[51] Int. Cl.[7] .................................................. H04L 12/28
[52] U.S. Cl. .......................................... 370/395; 370/400
[58] Field of Search .................................. 370/395, 396, 370/397, 398, 399, 410, 218, 235, 236, 237, 238, 400

[56] References Cited

U.S. PATENT DOCUMENTS

| 5,649,108 | 7/1997 | Spiegel | 370/400 |
| 5,712,854 | 1/1998 | Dieudonne | 370/399 |
| 5,805,593 | 9/1998 | Busche | 370/396 |
| 5,809,011 | 9/1998 | Almay | 370/395 |

FOREIGN PATENT DOCUMENTS 5-3489  1/1993  Japan .
6-37783  2/1994  Japan .

Primary Examiner—Ajit Patel
Assistant Examiner—Ricardo M. Pizarro
Attorney, Agent, or Firm—Sughrue, Mion, Zinn Macpeak & Seas, PLLC

[57] ABSTRACT

In an active/standby routing system for establishing an active route and the corresponding standby route in an ATM network, a node transmits, as a connection signaling message, a connection pair identifier which is unique to a combination of the active and the standby routes together with information which is indicative of either of active and standby routes. The active and the standby routes are quickly switched from one to another even when one of the routes is to be recalculated due to a trouble in the other route.

The connection signaling message is transmitted to both the active and the standby routes from the first node. A repeating node receives the message, sets the route indicated by the information indicating an active or standby route in the received message and thereafter transmits the message. An end node records information on paired active and standby routes from the connection signaling message received through the active and the standby routes to maintain correspondence between active and standby routes.

8 Claims, 4 Drawing Sheets

Ma : SETUP SIGNALING MESSAGE

Mb : ACTIVE SETUP SIGNALING MESSAGE

Mc : SETUP SIGNALING MESSAGE

Md : STANDBY SETUP SIGNALING MESSAGE

MESSAGES Mb AND Md

| SIGNALING INFORMATION | CONNECTION PAIR IDENTIFIER | ACTIVE/STANDBY INFORMATION |

ACTIVE/STANDBY ROUTING SYSTEM ON ATM NETWORK

BACKGROUND OF THE INVENTION

In an ATM (asynchronous transfer mode) network in which a standby route is set in addition to an active route to be normally used when route calculations are made based on topology information exchanged between the nodes, the present invention particularly relates to an active/standby routing system capable of reducing time required for setting a standby route again for reasons such as a trouble in a bypass in order to allow the active route to be recovered from a trouble.

In a conventional active/standby routing system in an ATM network of this type, there is provided a centralized management apparatus for managing the network topology on a centralized basis. Such a centralized management apparatus collects network topology information from all nodes to calculate a standby route in advance in order to allow a connection to be recovered from a trouble with a small delay.

When the centralized management apparatus sets an active connection, it also sets a standby route for the active connection. A system has been employed wherein, in the case of a trouble, a switching control signal is transmitted from a centralized controller of the centralized management apparatus to each node to switch the connection at each node.

Further, a centralized management apparatus may employ a system wherein no standby route is set in advance and, in the case of a trouble, a route to avoid the trouble is calculated to set a connection to bypass the same.

In a network having a configuration as described above, since the centralized management apparatus can manage information on the topology of the network, a standby route for an active route can be determined.

Meanwhile, for example, Japanese unexamined patent publication No. H4-65942 discloses a technique that does not rely on a centralized control system. In this system, each node has a plurality of predetermined standby routes and normally monitors the state of the standby routes. In the case of a trouble, such a node selects a route appropriate for the state of trouble which has been defined in advance.

Further, for example, in a system disclosed in Japanese unexamined patent publication No. H6-62001, a control frame is generated in the case of a trouble and is transmitted to all routes connected to allow the nodes that receive this control frame to determine a standby route.

In addition, according to the PNNI protocol based on "Private Network-Network Interface: Specification Version 1.0 (PNNI 1.0) (March, 1996)" defined by ATM Forum Technical Committee which is the technical background of the invention, there is defined a routing means for allowing each node to exchange network topology information independently and a signaling means for allowing it to set a connection, and thus lines are connected using a dynamic source routing system. Therefore, in the case of a trouble, the line having the trouble is disconnected.

Among the above-described conventional active/standby routing systems in an ATM network, according to the method of managing network topology on a centralized basis, in the case of an active trouble in a relevant bypass route during operation of the network, it is necessary to calculate another alternative route. Therefore, this method has a problem in that it takes long time to carry out calculations at a large scale and it also takes long time to process information.

The reason is that it is required to calculate bypass routes for all combinations in even a large-scale network in advance, which results in complicated algorithm. Further, centralized management requires various kinds of information in a large amount and requires a long time to collect and process such information.

The above-mentioned method disclosed in Japanese unexamined patent publication No. H4-65942 has a problem in that a large amount of processing is required when a change is made to the configuration of a network during the setting of standby routes which are prepared in advance. The reason is that a change in the network configuration inevitably results in some change in a table which is maintained by every node that forms a part of the network.

The above-mentioned method disclosed in Japanese unexamined patent publication No. H6-62001 has a problem in that it takes long time to complete the switching operation. The reason is that many processing steps are involved because a control frame is generated in response to the occurrence of a trouble to initiate route searching and then the route switching follows.

In a network utilizing the PNNI protocol for connecting lines on a dynamic source routing basis which is the technical background of the invention, it is advantageous to employ a technique to set a standby connection after the starting node sets an active connection and to perform a process of switching the active connection to the standby connection with a small delay in the case of a trouble in the active connection. There is however a problem in that such a switching process with a small delay is impossible. The reason is that although the starting node and end node must know a standby connection for allowing a certain active connection to recover from a trouble in advance in order to perform the switching process with a small delay, conventional signaling does not include information indicating such a pair of active and standby connections.

It is an object of the present invention to provide an active/standby routing system in an ATM network wherein the above-described problems are solved; time required for switching a relevant active route having a trouble to a standby route during active operation of the network is reduced; and the scale of calculations or information processing is reduced to reduce processing time even when another alternative route is to be recalculated because of a trouble in the relevant bypass route.

SUMMARY OF THE INVENTION

An active/standby routing system in an ATM network according to the invention will be described in the context of an active/standby routing system in an ATM network in which route calculations are carried out based on topology information exchanged between the nodes and in which a standby route is set in addition to an active route set for normal use in order to allow the active node to be recovered from a trouble.

In this system, each of the nodes includes a route calculating means which carries out route calculations based on topology information exchanged therebetween and includes, in a connection setup signaling message exchanged between the nodes for routing, a connection pair identifier unique in the ATM network for allowing a determination that the active route and standby route thus set are paired and active/standby information for indicating either of the active and standby routes.

This configuration is characterized in that when each of the nodes sets a connection, it sets the active and standby routes using the connection setup signaling message including the connection pair identifier and active/standby information and in that it recognizes the correspondence between active and standby routes.

Another configuration of the invention is characterized in that each node performs the functions described below depending its position in a route.

First, a node acting as a starting point transmits a connection setup signaling message including a connection pair identifier and the relevant active/standby information to each of the active route as described above obtained by route calculations and a standby route that is paired with the active route.

Next, a node acting as a repeating point receives the connection setup signaling message and sets either of the active and standby routes indicated by the active/standby information in the received connection setup signaling message and transmits a predetermined connection setup signaling message.

Finally, a node acting as an end point records information on the paired active and standby routes in the connection setup signaling message received from each of the set active and standby routes to maintain correspondence between active and standby routes.

With the above-described configuration, each node carries out route calculations based on topology information exchanged therebetween to set an active route for normal use and to set a standby route for the recovery of the active route from a trouble in advance. Therefore, when an end node receives a connection setup signaling message, it can determine whether the signaling is for setting an active route or for setting a standby route and can recognize which active route is paired with which standby route. That is, since it is possible for a network to know a standby route which is associated with an active route in trouble, switching at each node is facilitated.

In summary, each node in an ATM network independently exchanges network topology with other nodes and is connected to others according to a protocol that allows discrete and dynamic source routing based on the information to form the ATM network, and information indicating an active route and a standby route which are paired with each other is included in signaling information. Thus, in a network utilizing a protocol for connecting lines on a dynamic source routing basis, as a measure to overcome the limit placed on processing according to a centralized method of management which is used for a large scale, it is possible for a starting node to set a standby connection after setting an active connection and to perform a switching process in the case of a trouble in the active route, and the starting node and an end node can know which standby route is available to allow the active route to be recovered from the trouble.

DESCRIPTION OF THE PREFERRED EMBODIMENTS

Preferred embodiments of the invention will now be described with reference to the drawings.

The present invention is different from the prior art in that no centralized management apparatus is provided in an ATM network which is a network utilizing the ATM technique; each node exchanges network topology information with other nodes independently; and a starting node to which the starting terminal that has requested a route is connected performs the process described below in setting a route.

The starting node dynamically calculates a route up to the end node to which the end terminal is connected that satisfies the quality required for the route based on network topology information and performs line connection through signaling utilizing a source routing system that explicitly specifies the route. Further, a standby route is set in advance during the routing in addition to the route actively used taking troubles in the network into consideration.

Figure 1:
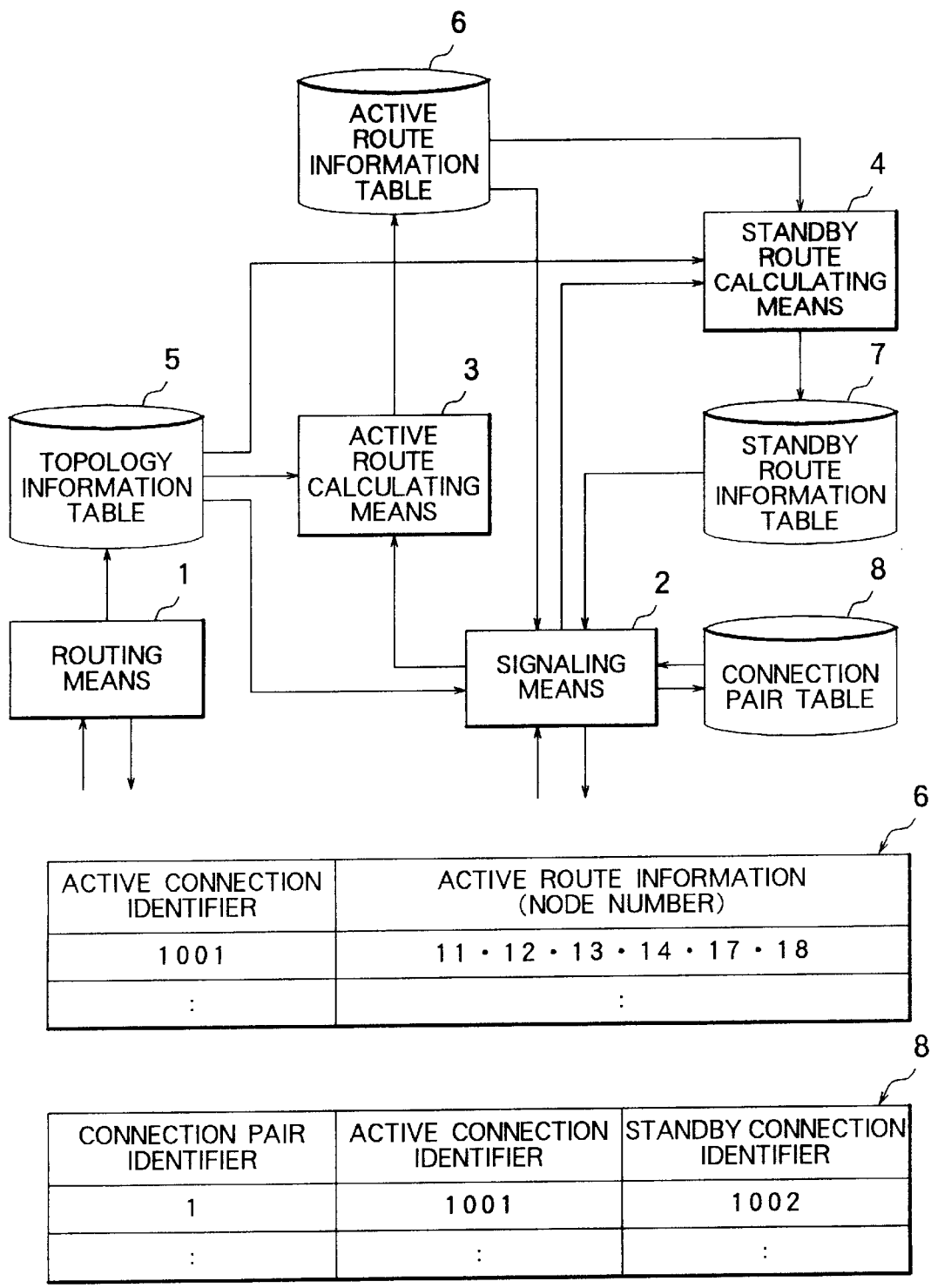
FIG. 1 is a functional block diagram of a node showing an embodiment of the invention.

FIG. 1 is a functional block diagram showing an embodiment of the present invention. FIG. 1 shows major components provided at each node.

As illustrated, a node includes a routing means 1, a signaling means 2, an active route calculating means 3, a standby route calculating means 4, a topology information table 5, an active route information table 6, a standby route information table 7 and a connection pair table 8.

The topology information table 5 stores topology information indicating the configuration of the network and the utilization of network resources. Further, as illustrated, the active route information table 6 contains active connection identifiers and active route information. The connection pair table 8 contains connection pair identifiers and active and standby connection identifiers. The standby route information table 7 contains standby connection identifiers and standby route information similarly to the active route information table 6.

The functions and means utilized at a node having such means and tables vary depending on the state of the same in the route, e.g., depending on its position on the route of connection, i.e., whether it is the starting node, repeating node or end node.

Figure 2:
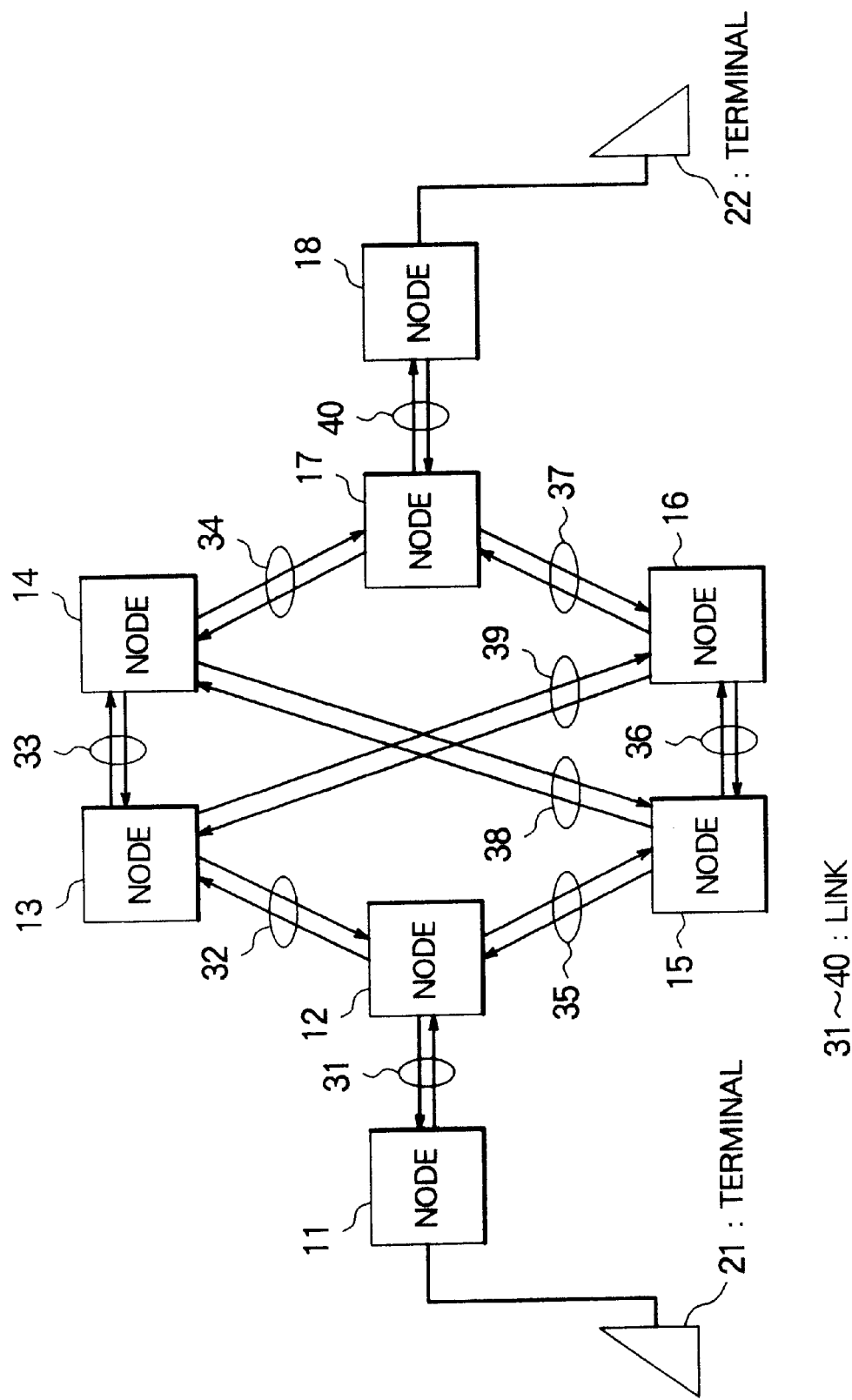
FIG. 2 illustrates the operation of a message for routing on a network showing an embodiment of the invention.

FIG. 2 shows an example of a state of connection of nodes in an ATM network.

As illustrated, a node 11 connects a terminal 21; a link 31 connects the node 11 and a node 12; a link 32 connects the node 12 and a node 13; a link 33 connects the node 13 and a node 14; a link 34 connects the node 14 and a node 17; a link 35 connects the node 12 and a node 15; a link 36 connects the node 15 and a node 16; a link 37 connects the nodes 16 and 17; a link 38 connects the nodes 14 and 15; a link 39 connects the nodes 13 and 16; and a link 40 connects the node 17 and a node 18. The node 18 connects a terminal 22.

Figure 3:
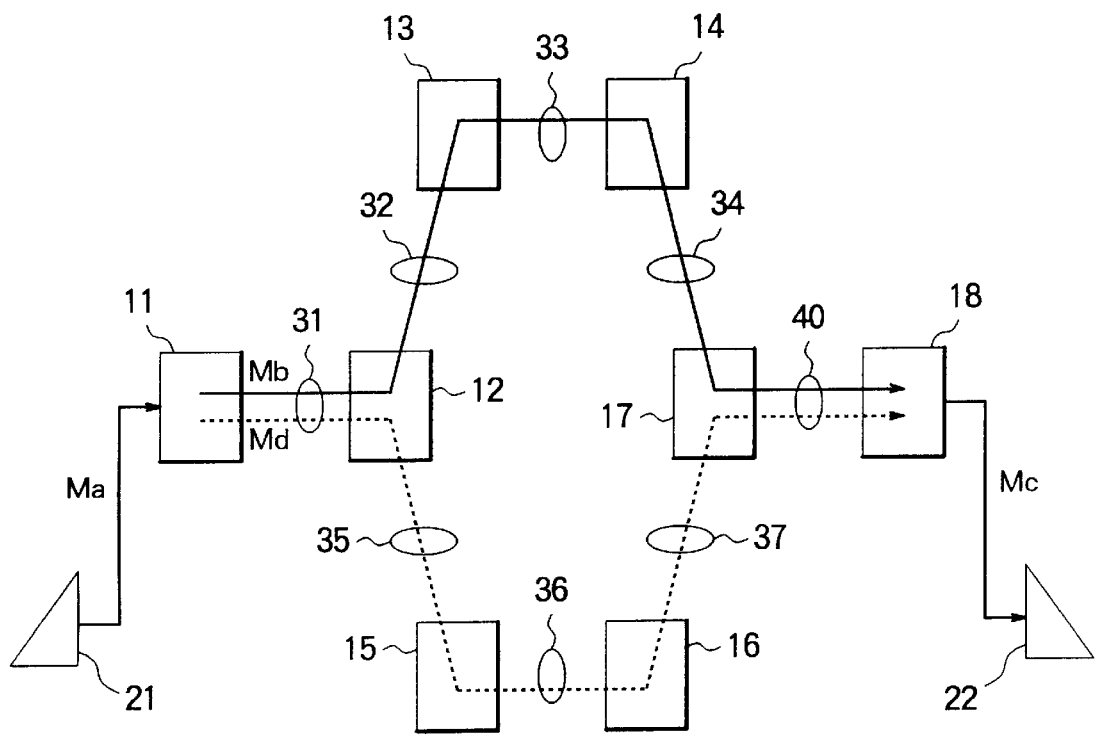
FIG. 3 illustrates the operation of a setup signaling message on a network showing an embodiment of the invention.

FIG. 3 shows examples of messages for setting a new route from the terminal 21 as the starting point to the terminal 22 at the end point in the ATM network shown in FIG. 2 and shows an example of such a route. As illustrated, active/standby setup signaling messages Mb and Md that travel between the nodes during the routing include storage areas for a connection pair identifier and active/standby information in addition to conventional signaling information required for routing.

Referring now to FIGS. 1 through 3 together, a description will now be made on functions of signaling and routing performed at each of the starting node 11, repeating nodes 12 through 17 and end node 18 which are positions on a route for connection.

The routing means 1 performs the same function for any node in any routing state and has a protocol of the same specifications as those of the PNNI routing protocol defined by the ATM forum. A routing means 1 normally transmits and receives routing messages to and from nodes adjacent thereto as shown in FIG. 2.

When it is determined that the information included in a routing message exchanged between adjacent nodes is different from the information stored in the topology information table 5 of the node to which a routing means 1 belongs and that updating is required according to certain rules, the routing means 1 updates the information stored. When it is further required to transfer the topology information it has received to another node, the routing means 1 transmits the received topology information. Each node repeats this sequentially and, as a result, all nodes in the network eventually hold information on the topology of the network as a whole in the respective topology information tables 5.

As to the signaling means 2, since it performs different processes depending on the states of nodes in a route, it will be described referring to a starting node, a repeating node and an end node sequentially.

First, the signaling means 2 of the starting node 11 processes signaling messages regarding routing. It has a protocol having specifications substantially the same as those of the PNNI signaling protocol defined by the ATM forum. The signaling means 2 generally comprises two processing steps. One is a process of setting an active route, and the other is a process of setting a standby route. Each of the procedures will be described below separately.

First, the process of setting an active route at the starting node 11 will be described.

Upon receipt of a setup signaling message Ma for routing from the terminal 21 at the starting point, the signaling means 2 issues a request for route calculations to notify of the active route calculating means 3 of a need for route calculations. Upon receipt of the request for route calculations, the active route calculating means 3 calculates an active route with reference to the topology information table 5 and, after the route is determined, information on the determined active route is set in the active route information table 6.

The signaling means 2 transmits an active setup signaling message Mb to the node 12 which is the next node to be connected on the route based on the active route information set in the active route information table 6. As shown in FIG. 3, in addition to conventional signaling information required for setting a connection, this message Mb is added with a connection pair identifier and active/standby information having contents indicating the fact that this route is an active route. A connection pair identifier is a identifier which is unique in the network.

Upon receipt of a response message corresponding to the transmitted signaling message Mb, the signaling means 2 analyzes the contents thereof. If the active route has been properly set, it transmits the response message to the starting terminal 21 which is the originator of the request for routing, sets the connection pair identifier and the active connection identifier in the connection pair table 8, and proceeds to the next process of setting a standby route.

If the response message indicates a failure in the process of routing, the procedure for setting an active route is executed again.

Next, the process of setting a standby mode at the starting node 11 will be described.

After the setting of the active route is completed, the signaling means 2 of the starting node 11 issues a request for route calculation to notify the standby route calculating means 4 of a need for calculating a standby route. Upon receipt of the request for route calculations, the standby route calculating means 4 calculates a standby route with reference to the topology information table 5 and the active route information in the active route information table 6.

After the standby route is determined, the signaling means 2 sets information on the determined standby route in the standby route information table 7 and transmits a standby setup signaling message Md to the node 12 which is the next node to be connected on this standby route. As shown in FIG. 3, in addition to conventional signaling information required for setting a connection, the signaling message Md transmitted here is added with a connection pair identifier and active/standby information having contents indicating the fact that this route is a standby route. A value which is the same as that used in setting the active route as described above is set in this connection pair identifier.

Upon receipt of a response message corresponding to the transmitted signaling message Md, the signaling means 2 analyzes the contents of the received response message. If the route has been properly set, the process of setting a standby route is terminated. On the other hand, if the response message indicates a failure in the process of routing, the procedure for setting a standby route is executed again.

Next, the operation of the signaling means 2 of the repeating node 12 will be described.

The repeating node 12 utilizes the routing means 1 as described above and the signaling means 2 and topology information table 5 as described below.

Upon receipt of the setup signaling message Mb (Md) from the preceding node 11, the signaling means 2 of the repeating node 12 determines whether active network resources satisfy the level of quality requested by the received signal based on the contents of the topology information table 5. When it is determined that the resources satisfy the level of quality, the signaling means 2 reserves the network resources and transmits the setup signaling message Mb (Md) to the next node to be connected based on the route information included in the message.

If the network resources do not satisfy the requested level of quality, the signaling means 2 transmits a response message indicating failed routing to the node 11 which has transmitted the message. This is irrespective of whether the message is a message Mb for an active route or a message Md for a standby route.

Further, when it is determined from the contents of a response message to setup signaling that routing has failed, the signaling means 2 releases the resources that have been reserved upon the request for routing and transmits the response message to the node which has transmitted the request. On the other hand, if the routing has been successful, the response message is transmitted as it is to the node which has transmitted the request.

Although the above description has referred to the node 12 as the repeating node, other nodes 13 through 17 have the same functions and operate in the same way as described above.

Next, the operation of the signaling means 2 of the end node 18 will be described. The end node 18 utilizes the routing means 1 as described above and the signaling means 2 at the end node 18 and an active and standby connection pair table 8.

Upon receipt of an active setup signaling message Mb from the preceding node 17, the signaling means 2 of the end node 18 refers to the active/standby information included in the message. Since the contents of the active/standby information indicate an active route, it sets a route up to the end terminal 22, sets the connection pair identifier and active connection identifier in the connection pair table 8, and transmits a response message to the node from which it has received transmission.

In the case of a standby setup signaling message Md whose active/standby information indicates a standby route, the same connection pair identifier is searched on the connection pair table 8 and a standby connection identifier is set the connection pair table 8 in association with the active route.

Next, the remaining components, i.e., the active route calculating means 3 and standby route calculating means 4 will be described. Both of the active route calculating means 3 and standby route calculating means 4 function only at the starting node 11, and their functions are not used in the repeating nodes or the end node.

The active route calculating means 3 is activated when there is a request for setting an active route from the signaling means 2 and carries out route calculations to determine a route with reference to the contents in the topology information table 5 and the contents of the quality requested by the setup signaling message Ma. The result of the route calculations explicitly indicates a route to the end node. Further, the result of the route calculations is set in the active route information table 6.

The standby route calculating means 4 is activated when there is a request for setting a standby route from the signaling means 2 and carries out route calculations to determine a route with reference to the contents of the active route information table 6 in addition to the contents of the topology information table 5 and the contents of the quality requested by the setup signaling message Ma. The route calculations at this time are carried out to obtain a route which is as much different from the active route as possible, and the result of the route calculations explicitly indicates a route to the end node. The result of the route calculations is set in the standby route information table 7.

A description will now be made on a specific routing operation with reference to FIGS. 1, 3, 4, and 5.

In this example, the terminal 21 acts as a starting terminal, and a new connection to the terminal 22 as an end terminal is set.

The starting node 11 to which the terminal 21 as a starting terminal is connected and which acts as a starting point of the route performs a process which is generally divided into two parts. One is a process of setting an active route to the end node 18 to which the terminal 22 as an end terminal is connected, and the other is a process of setting a standby route up to the same end node 18. The operation of each of those processes will be described below. For simplicity of the description, only the band to be used will be discussed as the level of quality required for the connection.

Figure 4:
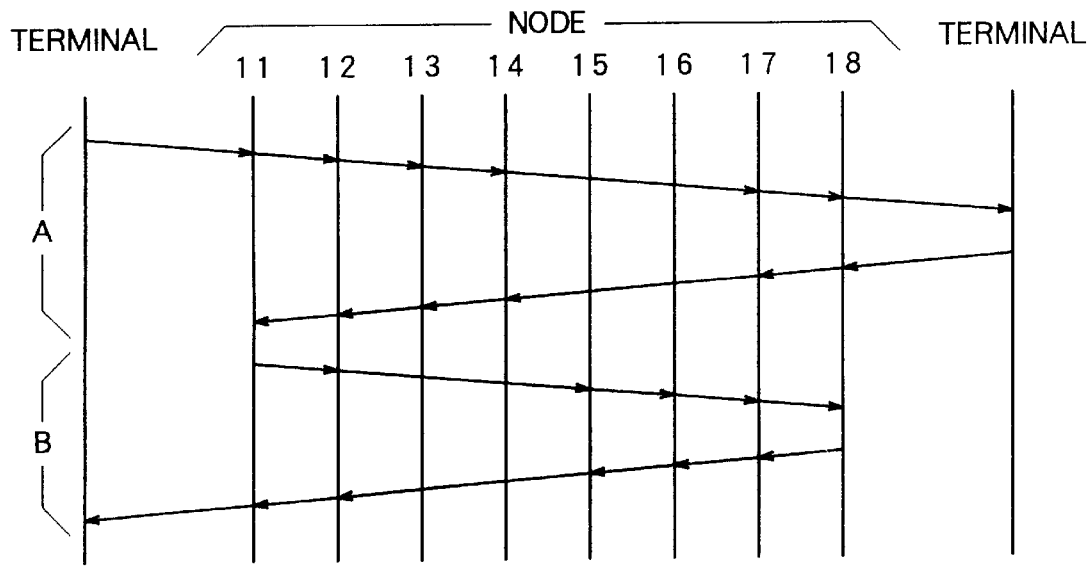
FIG. 4 is a sequence chart in the case of proper routing showing an embodiment of the invention.

First, a description will be made on a proper operation of the process of setting an active current indicated by A in FIG. 4.

The signaling means 2 of the starting node 11 requests the active route calculating means 3 to carry out route calculations and obtains active route information as a result of the calculations from the active route information table 6. The active route calculating means 3 refers to the topology information table 5 in calculating the active route information. A specific example of the calculations may utilize the Dijkstra algorithm. This algorithm provides a route that requires a minimum cost.

If calculations result in a route that starts from the node 11, passes through the nodes 13, 14 and 17 sequentially, and reaches the node 18 and if the used band which is the quality required for the active route is 50 Mbps, the active route calculating means 3 determines with reference to the topology information table 5 whether all of the links 31 though 34 and the link 40 satisfy the required band of 50 Mbps to be used.

If the requirement is satisfied, route information as a result of the calculations is maintained in the active route information table 6 and, then, the starting node 11 reserves the resources of the link 31 which is the route from the node 11 to the node 12. For example, "to reserve the resources" is to use 50 Mbps when the remaining band of the link 31 is 150 Mbps. That is, reserving the resource means a band of 100 Mbps is left for the link 31.

Based on this route information, an active setup signaling message Mb is transmitted from the starting node 11 to the repeating node 12 which is the next node to be connected to be forwarded eventually to the end node 18 to which the end terminal 22 is connected. At this time, as shown in FIG. 3, the active setup signaling message Mb is added with a connection pair identifier and active/standby information indicating this connection is an active connection.

The connection pair identifier is unique in the network. Specifically, it can be provided by combining a node ID which is unique in the network and a sequential number which is managed by the node.

On the other hand, when the route information indicates that the required quality is not satisfied, the route is recalculated, and the calculations are repeated until the required quality is satisfied.

Further, upon receipt of the active setup signaling message Mb from the node 11, the node 12 acting as a repeating node determines from the contents of the topology information table 5 in the node 12 whether the resources of the link 32 which is the relevant route satisfy the quality required for the route.

If it is determined that the requirement is satisfied, the resources of the link 32 are reserved, and the active setup signaling message Mb is transmitted to the node 13 which is the next node to be connected. Thus, the signaling message is passed to each node sequentially based on the route information. That is, the message is sequentially passed to the subsequent nodes 14, 17 and 18 in the order listed.

The node 18 as the end node confirms that the active/standby information included in the message has contents indicating an active connection and sets the active connection identifier and connection pair identifier.

A setup signaling message Mc is transmitted to the terminal 22 and, thereafter, a setup signaling response message is passed to the nodes 18, 17, 14, 13, 12 and 11 in the order listed via a route which is the reverse of that has been set.

Upon receipt of this response message indicating that the connection has been set from the end node 18, the signaling means 2 of the node 11 sets the active connection identifier and connection pair identifier in the connection pair table 8 in the node 11 and transmits a response message to the terminal 21.

Figure 5:
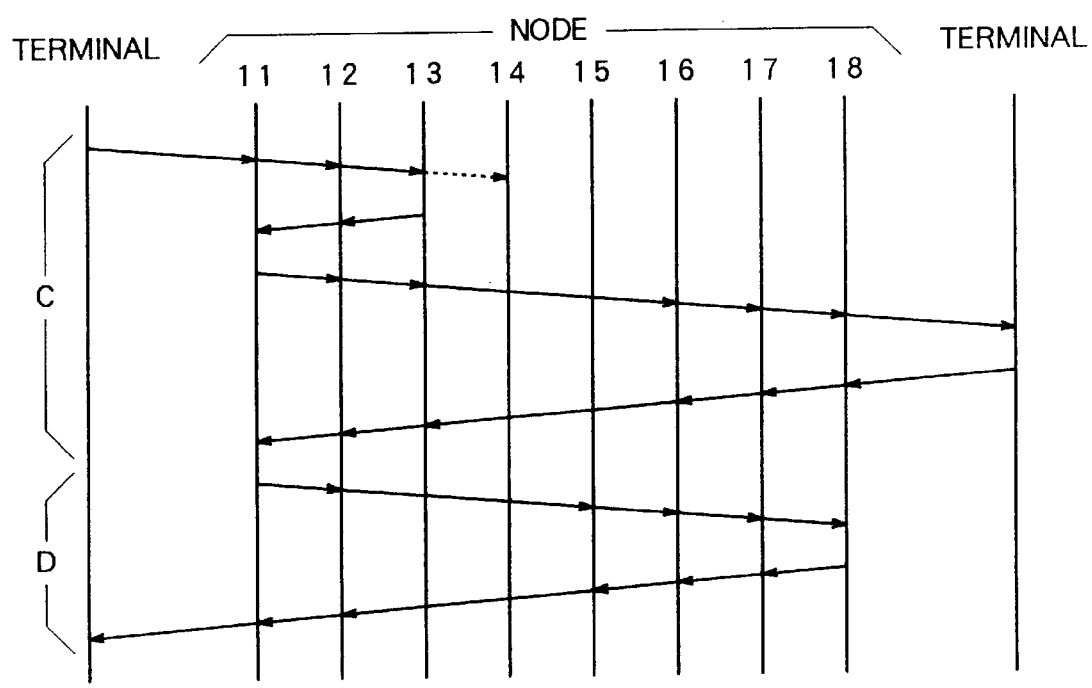
FIG. 5 is a sequence chart in the case of failed routing showing an embodiment of the invention.

Next, a description will now be made on a failure of routing during the operation of the process of setting an active route indicated by C in FIG. 5.

When the quality requested by the setup signaling message is not satisfied in any point in the route, e.g., when only a band of 40 Mbps is left for the route from the node 13 to the node 14, the routing has failed and a setup signaling response message is transmitted to the preceding node to indicate the reservation of resources has been unsuccessful.

Upon receipt of this response message, the node 12 releases the resources of the link 32 which has been reserved, i.e., adds the band of 50 Mbps which has been reserved to the remaining band of the link 32 and further transmits a setup signaling message to the node 11 to indicate that the reservation of resources has been unsuccessful.

At the node 11, the resources of the link 32 are similarly released, and the active route calculating means 3 carries out route calculation again. Thus, routing is carried out again.

Next, a description will be made with reference to the drawings on the setting of a standby route as indicated by B in FIG. 4 or D in FIG. 5.

After an active route is set, the standby route calculating means 4 of the starting node 11 calculates a route which is as much different from the active route as possible based on the information in the active route information table 6 and topology information table 5 and provides standby route information. In the example shown in FIG. 3, a partially different standby route is provided which extends from the nodes 11 through the nodes 12, 15, 16 and 17 to the node 18.

The signaling means 2 of the node 11 transmits a standby setup signaling message Md for the standby route to the node 12 which is the next node to be connected. In doing so, the signaling means 2 includes a connection pair identifier and active/standby information indicating that the connection is a standby connection in the message Md.

The node 12, 15, 16 or 17 which acts as a repeating node determines whether the quality required for the connection is satisfied as done in setting of the active route without regard to the connection pair identifier and active/standby information and, if it is determined that the quality is satisfied, it transmits the message to the next node.

The end node 18 pays attention to the active/standby information and, since it indicates a standby connection, the end node 18 searches the active route having the same connection pair identifier in the connection pair table 8 and sets the standby connection identifier. Then, the end node 18 transmits a setup signaling response message to the node 11 which is the originator of the request.

On the other hand, when it is determined at any repeating node on the way that the level of quality required for the connection is not satisfied, the repeating node sends a response message to the node 11 which is the originator to indicate such a situation. In this case, the node 11 calculates and sets another route. A standby route may be provided using a method wherein route information is only maintained first and used only after resources are reserved when switching occurs. Therefore, it is not essential to reserve resources when a standby route is set.

As described above, the system according to the invention, an identifier unique in a network and active/standby information are included in a message for setting a connection to indicate a combination of an active route and a standby route which are associated with each other. This is advantageous in that a standby route to serve as a bypass route for an active route can be set even in a network utilizing a protocol for connecting lines using a source routing system wherein a route is calculated based on topology information exchanged between the nodes.

Although the present invention and its advantages have been described in detail, it should be understood by those skilled in the art that various changed, substitutions and alterations can be made herein without departing from the spirit and scope of the invention as defined by the appended claims.

What is claimed is:

1. An active/standby routing system for use in an ATM (asynchronous transfer mode) network of communication nodes interconnected by links, said network having a topology described by topology information, to establish an active route and a standby route on the basis of said topology information between nodes:

a connection signaling message exchanged between the nodes for routing includes a connection pair identifier unique to the ATM network to identify the active route and a standby route that is paired with the active route and active/standby information indicating either of the active and standby route; and the nodes include
      a topology information table for storing routing messages;
      active and standby route information tables for recording information related to routes that have been set up;
      a connection pair table for recording information related to paired active and standby routes which have been set up;
      routine means for exchanging routing messages with adjacent nodes to update the topology information table; and
      signaling means for requesting calculations of an active route and a standby route for the active route, for obtaining each of the routes which have been set up from the route information table, and for generating setup signaling messages and sending them through the set routes, when one of said nodes is operable as a first node, wherein one of said nodes is operable as a repeating node and comprises:
      signaling means for setting routes based on the signaling messages received and transmitting the same through the set routes.

2. An active/standby routing system as claimed in claim 1, whereon one of said nodes is operable as an end node and comprises:
   signaling means for extracting the information on the paired active and standby routes from the setup signaling messages and recording it in the connection pair table.

3. An active/standby routing system as claimed in claim 2, wherein each of the nodes further comprises:
   route calculating means for calculating routes in accordance with predetermined rules in response to a request from the signaling means and for recording the calculated routes in a route information table such that active and standby routes are distinguished from each other.

4. An active/standby routing system as claimed in claim 3, wherein at least one of the first and the end nodes recognizes correspondence between the active and standby routes.

5. An active/standby routine system for use in an ATM (asynchronous transfer mode) network of communication nodes interconnected by links, said network having a topology described by topology information, to establish an active route and a standby route on the basis of said topology information between nodes;

a connection signaling message exchanged between the nodes for routine includes a connection pair identifier unique to the ATM network to identify the active route and a standby route that is paired with the active route and active/standby information indicating either of the active and standby route; and the nodes include a topology information table for storing routine messages;

active and standby route information tables for recording information related to routes that have been set up;

a connection pair table for recording information related to paired active and standby routes which have been set up;

a router for exchanging routine messages with adjacent nodes to update the topology information table; and a signaler for requesting calculations of an active route and a standby route for the active route, for obtaining each of the routes which have been set up from the route information table, and for generating setup signaling messages and sending them through the set routes, when one of said nodes is operable as a first node, wherein one of said nodes is operable as a repeating node and comprises:

a signaler for setting routes based on the signaling messages received and transmitting the same through the set routes.

6. An active/standby routing system as claimed in claim 5, wherein one of said nodes is operable as an end node and comprises:

a signaler for extracting the information on the paired active and standby routes from the setup signaling messages and recording it in the connection pair table.

7. An active/standby routing system as claimed in claim 6, wherein each of the nodes further comprises:

a route calculator for calculating routes in accordance with predetermined rules in response to a request from the signaler and for recording the calculated routes in a route information table such that active and standby routes are distinguished from each other.

8. An active/standby routing system as claimed in claim 7, wherein at least one of the first and the end nodes recognizes correspondence between the active and standby routes.

* * * * *